United States Patent [19]

Christensen et al.

[11] Patent Number: 5,307,627
[45] Date of Patent: May 3, 1994

[54] METHOD AND APPARATUS FOR OXIDIZING HYDROCARBONS FROM EXHAUST GASES

[75] Inventors: Louis R. Christensen, Canton; Matthew J. Gladd, Dearborn; Harendra S. Gandhi, Farmington, all of Mich.

[73] Assignee: Ford Motor Company, Dearborn, Mich.

[21] Appl. No.: 1,601

[22] Filed: Jan. 7, 1993

[51] Int. Cl.[5] .............................................. F01N 3/20
[52] U.S. Cl. ...................................... 60/274; 60/297; 60/300; 60/311; 422/169
[58] Field of Search ................. 60/274, 297, 300, 311; 422/169

[56] References Cited

U.S. PATENT DOCUMENTS

| | | | |
|---|---|---|---|
| 5,125,231 | 6/1992 | Patil | 60/288 |
| 5,140,811 | 8/1992 | Minami | 422/169 |
| 5,142,864 | 9/1992 | Dunne | 60/297 |

FOREIGN PATENT DOCUMENTS 485179  5/1992  European Pat. Off. ............. 60/297

Primary Examiner—Douglas Hart
Attorney, Agent, or Firm—Roger L. May; Lorraine S. Melotik

[57] ABSTRACT

An apparatus and method for oxidizing hydrocarbons in gases exhausted from an internal combustion engine 10. The method comprises passing exhaust gases, during initial operation of the engine, through a hydrocarbon trap 24, where the hydrocarbons in the exhaust gases are adsorbed before the gases are exhausted into the atmosphere. After a catalyst 16 is heated to the light-off temperature for hydrocarbons, the gases are prevented from passing through the hydrocarbon trap 24 and are passed through the catalyst 16 before being exhausted into the atmosphere. When the engine 10 speed is at steady state, such that the oxidation of hydrocarbons by the catalyst 16 is at peak efficiency, a portion of the gases exiting the catalyst 16 is diverted to pass through and flush hydrocarbons from the hydrocarbon trap 24 while the remaining gas is exhausted into the atmosphere. The diverted gases containing the flushed hydrocarbons desorbed from the hydrocarbon trap 24 are then passed through the catalyst 16. After the hydrocarbons have been desorbed from the hydrocarbon trap 24, all gases passing through the catalyst 16 are exhausted into the atmosphere.

20 Claims, 1 Drawing Sheet

METHOD AND APPARATUS FOR OXIDIZING HYDROCARBONS FROM EXHAUST GASES

TECHNICAL FIELD

This invention is directed to a method and apparatus for oxidizing hydrocarbons contained in the gases exhausted from an internal combustion engine and more specifically to a method and apparatus for efficiently desorbing hydrocarbons from a hydrocarbon trap and oxidizing those hydrocarbons.

BACKGROUND ART

An internal combustion engine is typically operated under conditions in which there is insufficient oxygen or heat to oxidize all of the hydrocarbons present in the fuel being burned. By such a burning operation, there are developed exhaust gases which contain unburned hydrocarbons.

At present, it is proposed in the United States that motor vehicles be required to comply with emissions standards which progressively are becoming more stringent. Included within those proposals are requirements that hydrocarbon emissions be decreased significantly.

A number of methods have been developed and patented to oxidize the hydrocarbons in exhaust gases before those gases are exhausted into the atmosphere. However, none of those patents suggest the method or apparatus disclosed and claimed in this specification. Several of those patents are briefly reviewed here to show the state of the art.

U.S. Pat. No. 2,942,932 issued on Jun. 28, 1960 to Elliott for a "Process of Oxidizing Carbon Monoxide And Hydrocarbon In Exhaust Gases." The process disclosed comprises passing the exhaust gases during initial operation and warm up of the engine first through an adsorption zone in which hydrocarbons are adsorbed and then through an oxidation catalyst. As the engine warms up, hotter exhaust gases desorb the hydrocarbons from the adsorption zone while simultaneously bringing the oxidation catalyst to an effective operating temperature. After the exhaust gas reaches full operating temperature, the adsorption zone is in a regenerated condition and ready for a subsequent cold start-up. Means may also be provided for discontinuing the passage of hot exhaust gases through the adsorption zone after the oxidation catalyst has reached full operating temperature.

This method leaves certain problems unsolved. First, because the temperature at which the hydrocarbons will be desorbed is lower than the effective operating temperature of the oxidation catalyst, hydrocarbons will be desorbed from the adsorption zone before the oxidation catalyst is heated to an operational temperature. As a result, hydrocarbons desorbed from the adsorption zone will pass through the non-operational oxidation catalyst and be exhausted into the atmosphere. Second, because the adsorption zone precedes the oxidation catalyst, the exhaust gases used to desorb hydrocarbons from the adsorption zone will contain hydrocarbons. As a result, the adsorption zone will never be completely desorbed of hydrocarbons and the adsorption capacity of the adsorption zone during the next cold start of the engine will be reduced. Furthermore, the oxidation catalyst will be subjected to gases containing a larger quantity of hydrocarbons than normal—both those normally contained in the exhaust gases and those desorbed from the adsorption zone. If the hydrocarbon concentrations exceed the capacity of the oxidation catalyst, excess hydrocarbons will be exhausted into the atmosphere.

U.S. Pat. No. 3,150,192 issued on Sep. 29, 1964 to Ashley for a "Method Of Purifying Exhaust Gases Of Internal Combustion Engines." This patent discloses a method for oxidizing hydrocarbons from exhaust gases which comprises passing the exhaust gases sequentially through primary and secondary catalyst beds. During initial operation of the engine, hydrocarbons are adsorbed by the primary catalyst bed while auxiliary heat is applied to the secondary catalyst bed to rapidly raise the secondary catalyst bed to its oxidation temperature. The continuing passage of exhaust gases gradually raises the temperature of the primary bed catalyst to a point where the adsorbed hydrocarbons are desorbed and passed through the secondary catalyst bed which has been raised to its oxidation temperature.

While this method does provide for heating of the secondary catalyst bed to ensure that hydrocarbons later desorbed from the primary catalyst bed by the hot exhaust gases will be oxidized, this method still relies on hydrocarbon-laden exhaust gases to desorb the primary catalyst bed. Similar to the process claimed in the Elliott patent, this is not an efficient method of desorption and may lead to an excess discharge of hydrocarbons into the atmosphere.

U.S. Pat. No. 3,674,441 issued on Nov. 9, 1970 to Cole for an "Exhaust Emission Control." This patent shows a device for oxidizing hydrocarbons which comprises passing exhaust gases sequentially through a catalytic converter and a bed of storage material which retains hydrocarbons during warm up. After the catalytic converter is warmed up, the hydrocarbons retained in the storage bed are purged and recirculated back through the catalytic converter through the use of outside air.

This method avoids the problems posed by the patents already discussed by using outside air to desorb the adsorption storage material instead of exhaust gases. However, cooler outside air is not as efficient and requires much more time to desorb hydrocarbons as opposed to using hot exhaust gases from which the hydrocarbons have been oxidized. Because of this, if an internal combustion engine using the Cole method were operated repeatedly for short periods of time, the hydrocarbon storage bed would never be completely regenerated by the cooler outside air. In such a case, the hydrocarbons adsorbed in the hydrocarbon storage bed could build up during each start up until the hydrocarbon storage bed was saturated. If that happened, hydrocarbons would not be adsorbed by the saturated hydrocarbon trap during the next cold start up, but would simply be exhausted into the atmosphere.

U.S. Pat. No. 3,699,683 issued on Oct. 24, 1972 to Tourtellotte et al. for an "Engine Exhaust Emission Control System." This patent shows a method for oxidizing hydrocarbons by passing the exhaust gases emitted during engine start up first through an oxidizing catalyst bed and then through a hydrocarbon adsorbent bed which adsorbs hydrocarbons. When the engine exhaust gases are hot, most of the exhaust gases emitted from the oxidizing catalyst bed are then discharged directly into the atmosphere while the hydrocarbon adsorbent bed is regenerated by passing a small stream of hot exhaust gas through the hydrocarbon bed and recycling it to the engine.

The method disclosed in Tourtellotte et al. avoids the problem of using hydrocarbon laden exhaust gas to desorb hydrocarbons from the adsorbent bed by using exhaust gases from which hydrocarbons have already been oxidized in the catalyst bed to desorb hydrocarbons. However, this method does not account for the fact that during certain speed-load conditions, especially while the engine speed is changing in response to varying loads, the oxidation of hydrocarbons within the engine is much less efficient. During such conditions, the exhaust gases being oxidized in the catalyst bed contain a much higher percentage of hydrocarbons than would exist if the engine were running at steady state, that is, at a steady speed under steady load conditions and within a speed range where hydrocarbon oxidation within the engine is maximized. If the hydrocarbon bed is desorbed during periods when the engine is not running at steady state, then the desorbed hydrocarbons would be recycled back to the engine. Under those conditions, the percentage of unburned hydrocarbons in the exhaust gases exiting the engine and running through the catalyst bed would be even higher than normal. As a result, the catalyst bed would be subjected to exhaust gases abnormally rich in hydrocarbons. That could result in a loss of oxidation efficiency and the exhaust of gases into the atmosphere containing unburned hydrocarbons. Furthermore, if the hydrocarbon bed is desorbed during periods when the engine is not running at steady state, then the desorption gases will never be as hydrocarbon free as possible and the hydrocarbon bed will not be regenerated as quickly, as efficiently or as completely as would otherwise be possible.

Despite these and other teachings, there remains a need for a way to oxidize hydrocarbons efficiently at all stages of engine operation, and at the same time to reduce the exposure of the hydrocarbon adsorption materials to the high temperature gases needed to efficiently desorb them.

SUMMARY OF THE INVENTION

This invention relates to a method and apparatus for oxidizing hydrocarbons contained in the gases exhausted from an internal combustion engine. More particularly, this invention relates to a method and apparatus of desorbing a hydrocarbon trap, used in conjunction with a catalyst, to minimize the emission of hydrocarbons, to regenerate the hydrocarbon trap in the shortest period of time possible, and to minimize the exposure of the hydrocarbon trap to degenerative high temperature gases.

In accordance with the teaching of our invention, the method of treatment of exhaust gases is as follows.

The exhaust gases resulting from the burning of fuel within an internal combustion engine are passed into an exhaust manifold. The exhaust gases are then directed through a hydrocarbon trap used in conjunction with a catalyst.

During initial operation of the engine, and before the catalyst is heated by the exhaust gases to the light-off temperature for hydrocarbons, the hydrocarbons are adsorbed by the hydrocarbon trap.

Once the catalyst has been heated to the light-off temperature for hydrocarbons, whether by the exhaust gases alone or in conjunction with a means for applying auxiliary heat, the exhaust gas is diverted around the hydrocarbon trap. Then, when the engine is running at steady state, a portion of the treated gases exiting the catalyst are allowed to pass through the hydrocarbon trap. As a result, the most hydrocarbon-free exhaust gas possible is used to desorb hydrocarbons from the hydrocarbon trap.

The desorption of hydrocarbons and the resultant regeneration of the hydrocarbon trap during engine steady state provides our invention with several advantages.

One advantage is that because hydrocarbons are being desorbed from the hydrocarbon trap through the use of hot gases containing a minimal amount of hydrocarbons, the hydrocarbon trap can be desorbed and regenerated more completely.

A further advantage of the present invention is that by using exhaust gases containing the minimum amounts of hydrocarbons to desorb the hydrocarbon trap, the amount of time necessary to regenerate the hydrocarbon trap is decreased. Because hydrocarbon traps are typically based on adsorbent materials which can degenerate over a period of time as a result of being subjected to hot exhaust gases, this minimizes the exposure to hot gases and thus the degeneration.

Another advantage is that because the hydrocarbon trap can be desorbed more quickly and completely with this invention, the chance of the hydrocarbon trap becoming saturated with hydrocarbons as the result of using the internal combustion engine repeatedly for short periods of time is greatly decreased, thereby decreasing another avenue of hydrocarbon emissions.

Yet another advantage is that because the hydrocarbons desorbed from the hydrocarbon trap are circulated back through the catalyst during periods when the hydrocarbons contained in the exhaust gases are at a minimum, the catalyst is never subjected to gases unusually rich in hydrocarbons. As a result, emissions from this invention contain a smaller average percentage of hydrocarbons than would otherwise be the case.

Accordingly, a purpose of our invention is to provide a method and apparatus for oxidizing hydrocarbons contained in the gases exhausted from an internal combustion engine in a manner which minimizes both the emissions of unburned hydrocarbons and the exposure of adsorption materials to high temperature exhaust gases, thereby increasing the life and efficiency of those adsorption materials.

As for the apparatus of the present invention, which is positioned within the exhaust system of an internal combustion engine, in one preferred embodiment it includes a hydrocarbon trap downstream of the catalyst, and a pair of valve assemblies controlled by a common engine operating condition sensor and arranged respectively at the downstream end of the catalyst and the hydrocarbon trap. The apparatus further includes a flow circuit such that (i) all exhaust gases are directed via the exhaust pipe system through the hydrocarbon trap and out of the apparatus when the temperature of the catalyst is below the light-off temperature for hydrocarbons, (ii) the exhaust gases are prevented from passing through the hydrocarbon trap and directed via the exhaust pipe system through the catalyst and out of the apparatus when the catalyst is heated to the light-off temperature for hydrocarbons, and (iii) a portion of the gases exiting the catalyst may be diverted through the hydrocarbon trap when the engine speed is at a steady state such that the oxidation of hydrocarbons within the engine is at substantially a peak efficiency, thereby using those diverted gases to desorb and flush adsorbed hydrocarbons from the hydrocarbon trap back through the catalyst until all or at least a substantial portion of the adsorbed hydrocarbons have been desorbed from the hydrocarbon trap.

BEST MODE FOR CARRYING OUT THE INVENTION

Figure 1:
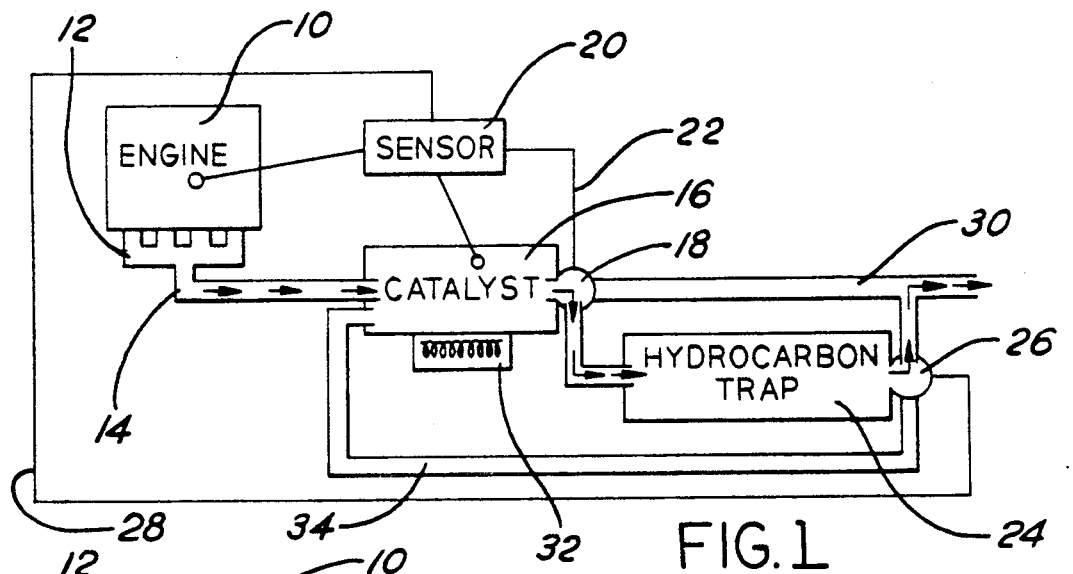
FIG. 1 schematically depicts an internal combustion engine having an emissions control system operated in accordance with the method of our invention and showing the flow of gas during initial start up.

Referring to FIG. 1, the method of our invention is preferably carried out in the following manner. An internal combustion engine 10 is operated under conditions in which there is insufficient oxygen or heat to oxidize all hydrocarbons present in the fuel being burned in the engine. In general, the engine is an internal combustion engine operating on gasoline or an alternative combustible fuel such as methanol, ethanol or natural gas.

The exhaust gases developed by burning the fuel in the engine are passed into an exhaust manifold 12 of the internal combustion engine 10. The exhaust gases then pass from the exhaust manifold 12 through a first exhaust pipe 14 to a catalyst 16. The catalyst 16 may comprise a typical oxidation catalyst or a three way catalyst.

In any case, the catalyst may be based primarily on palladium metal as the oxidizing catalyst. Palladium metal may be selected because palladium is substantially cheaper than other oxidizing catalysts, such as platinum. Palladium has another advantage in that it is available in North America as a mined material. The palladium catalyst is prepared in a standard manner by placing finely divided palladium on a suitable substrate material. In this case, the substrate material is a monolithic or pelletized support. The preparation of the substrate and the placement of palladium thereon are well known in the art, as is evidenced by the U.S. patents mentioned earlier, which are incorporated herein by reference, and the millions of motor vehicles presently on the road having catalyst substrates at least in part coated with palladium metal. In view of the fact that the preparation of palladium-based catalyst substrates are known in the art, no further discussion will be undertaken here.

After the exhaust gases pass through the catalyst 16, they pass through a valve means, a part of which in the embodiment depicted comprises a first valve assembly 18, the position of which is controlled by, and is in communication with, a control sensor 20 via line 22. The control sensor 20 determines the direction of flow through the first valve assembly 18, via line 22, depending on the temperature of the catalyst 16 and the speed of the engine 10.

The control sensor 20 may comprise an electronic engine control system linked to sensors within the engine 10 and the catalyst 16 so as to sense the speed of the engine 10 and the temperature of the catalyst 16. Such an electronic engine control system has all critical engine 10 speed and catalyst 16 temperature parameters in its memory and is programmed to control the valves as described. Because such electronic engine control systems are known in the art, no further discussion will be undertaken here. The line 22 may comprise suitable wiring over which electric signals may be sent or suitable tubing through which fluid, e.g. pneumatic, signals may be sent. In view of the fact that such wiring and tubing are known in the art, no further discussion will be undertaken here.

When the engine is first started, and during initial warm up, the first valve assembly 18 is positioned to direct all exhaust gases to a hydrocarbon trap 24 which desorbs hydrocarbons from the exhaust gases. The hydrocarbon trap 24 is based on any suitable solid material to provide the adsorption function. Typical usable materials include activated carbons such as charcoal, natural or artificial zeolites, activated alumina, Fuller's earth, kaolin, organic resins and the like, which may be employed either singly or in mixtures. In view of the fact that the preparation of such materials are known in the art, no further discussion will be undertaken here.

After the exhaust gases pass through the hydrocarbon trap 24, they are passed through the valve means, another part of which in the embodiment depicted comprises a second valve assembly 26. The position of the second valve assembly 26 is controlled by, and is in communication with, the control sensor 20 via line 28, to direct the flow of exhaust gases into the atmosphere through tailpipe 30. Line 28, similar to line 22, may transmit signals to close and open second valve assembly 26 either electrically or pneumatically.

The valve means, which in the embodiment depicted comprises first valve assembly 18 and second valve assembly 26, may comprise any suitable valve type mechanism or device suitable for the purposes set forth. Because such valves are generally known in the art, no further discussion will be undertaken here.

During engine warm up, the catalyst 16 is heated to the light-off temperature for hydrocarbons, which is typically 220° C. to 300° C. depending on the type of catalyst 16 material used. The heating of the catalyst 16 may be through the use of the hot exhaust gases alone or it may be accelerated through the use of an auxiliary heating means 32. The auxiliary heating means 32 may comprise an electric coil-type heater or any other heating means known in the art. Because such heating means are generally known in the art, no further discussion will be undertaken here.

Figure 2:
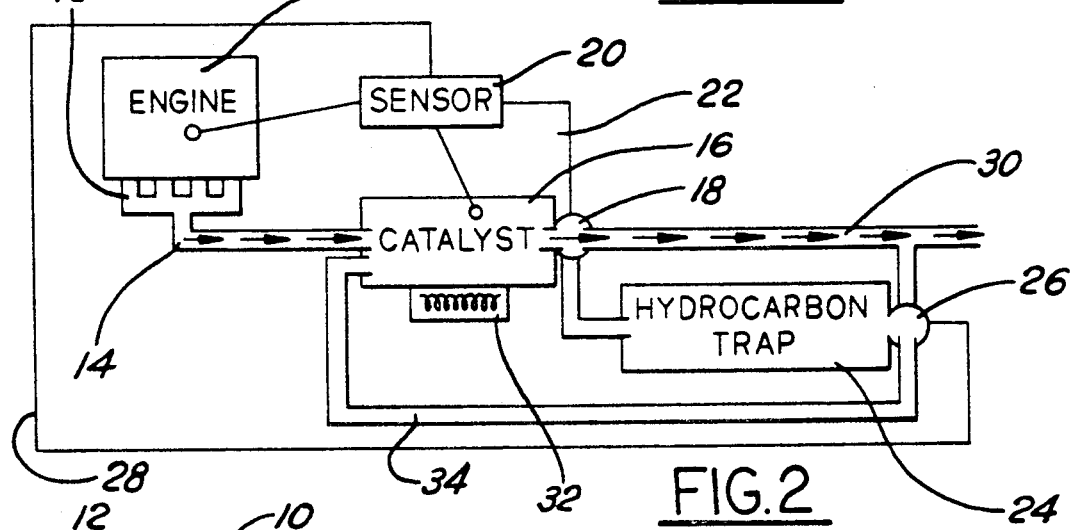
FIG. 2 schematically depicts the same system as FIG. 1 showing the flow of gas after the catalyst has been heated to the light-off temperature for hydrocarbons.

Referring to FIG. 2, when the catalyst 16 has reached the light-off temperature for hydrocarbons, the first valve assembly 18 is repositioned by the control sensor 20 via line 22 to prevent gases from passing through the hydrocarbon trap 24 and allowing the gases to be exhausted directly into the atmosphere through the tailpipe 30. At the same time, as shown, the second valve assembly 26 is repositioned by the control sensor 20 via line 28 to prevent gases from possibly circulating through, and desorbing hydrocarbons from, the hydrocarbon trap 24.

When the engine 10 is operated at a preferred steady state, the oxidation by catalyst 16 of hydrocarbons present in the fuel being burned in the engine 10 is maximized. Preferred steady state can be defined as when the engine 10 is running at a relatively constant rpm within an efficient rpm range during which hydrocarbon oxidation by the engine 10 is maximized. While steady state is achieved when a vehicle is driven at a relatively constant speed, the preferred steady state range for the purposes of this invention is generally when a vehicle is driven at a relatively constant speed between 30 to 60 miles per hour. During any transient modes, when the speed of the engine is shifting from low to high, or vice versa, the oxidation efficiency of the engine drops off. When a vehicle is operated at a relative constant speed of less than 30 miles per hour, the temperature of the exhaust gases is generally too low for efficient desorption of the hydrocarbon trap. When the vehicle is driven at relatively constant speeds above 60 miles per hour, the exhaust gases are too hot and could damage hydrocarbon trap 24 if allowed to pass through the hydrocarbon trap 24 while running at that speed. Of course, the preferred range of 30 to 60 miles per hour could differ depending on the type of vehicle, the particular engine control strategy, the resistance of the hydrocarbon trap 24 materials to high temperatures, and the efficiency at low temperatures. Because the degeneration temperatures and efficiency temperatures of various desorption materials are generally known in the art, or determinable through testing, no further discussion of those temperatures will be undertaken here.

Depending on that temperature range, the control sensor 20 may also determine the position of the first valve assembly 18 and the second valve assembly 26 based not only on the temperature of the catalyst 16 and speed of the engine 10, as already set forth, but also on the temperature of the gases exhausted from the engine 10. In that case, the control sensor 20 comprising an electronic engine control system, would also have a sensor within the engine 10 or the exhaust manifold 12, in addition to the sensors already set forth, to sense the temperature of the gases exhausted from the engine 10. In addition to the parameters already set forth, such an electronic engine control system also has the engine 10 exhaust gas temperature parameters in its memory and is programmed to control the valves as described.

Figure 3:
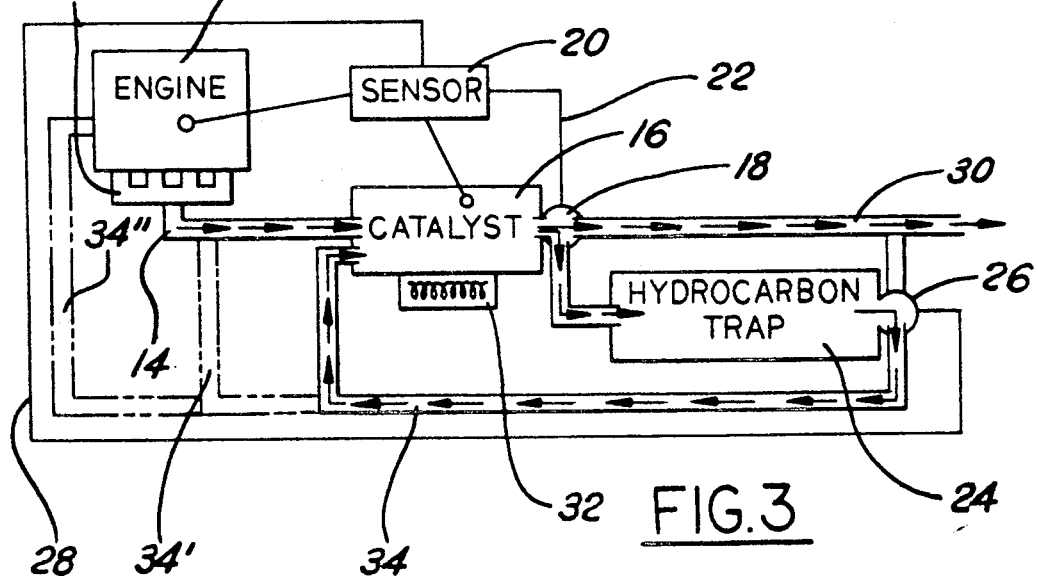
FIG. 3 schematically depicts the same system as FIG. 1 showing the flow of gas and the regeneration of the hydrocarbon trap during steady state operation of the engine.

Referring to FIG. 3, after the catalyst 16 has been heated to the light-off temperature for hydrocarbons, and when the engine speed is at steady state, the first valve assembly 18 is repositioned by the control sensor 20 via line 22 to divert a portion of the exhaust gases exiting the catalyst 16 to pass through and desorb hydrocarbons from the hydrocarbon trap 24. While the portion of gases used to desorb hydrocarbons from the hydrocarbon trap 24 may comprise any percentage of exhaust gases exiting the oxidation catalyst, the preferred range is 5% to 20%. At the same time, the second valve assembly 26 has already been repositioned by the control sensor 20 via line 28 to direct gases emitted from the hydrocarbon trap 24 through a second exhaust line 34 back through the catalyst 16, through a second exhaust line 34' to the first exhaust pipe 14 or through a second exhaust line 34" back through the engine 10.

After a sufficient time period has passed and the hydrocarbons have been desorbed and the hydrocarbon trap 24 has been regenerated, the first valve assembly 18 is again repositioned to the position shown in FIG. 2 by the control sensor 20 via line 22 into a position which discontinues the diversion of hydrocarbons through the hydrocarbon trap 24 and directs all gases emitted from the catalyst 16 directly to the atmosphere through the tailpipe 30. Depending on the type of materials used within the hydrocarbon trap 24, it would be possible through testing to determine the length of time required to desorb the hydrocarbon trap 24 as a function of prior use, engine speed and exhaust gas temperature. The control sensor 20 comprising an electronic engine control system could then be programmed accordingly to direct all gases away from the hydrocarbon trap 24 after all hydrocarbons, based on prior use, engine speed and exhaust gas temperature, have been desorbed from the hydrocarbon trap 24.

While particular embodiments of the invention have been illustrated and described, it will be obvious to those skilled in the art that various changes and modifications may be made to the method of our invention without departing from that invention. It is intended to cover in the appended claims all such modifications and equivalents as fall within the true spirit and scope of this invention.

We claim:

1. A method for oxidizing hydrocarbons contained in gases exhausted from an internal combustion engine, which comprises:
   providing a catalyst;
   passing the gases through a hydrocarbon trap and adsorbing hydrocarbons from the gases when the temperature of the catalyst is below a light-off temperature for hydrocarbons;
   preventing the gases from passing through the hydrocarbon trap after the catalyst is heated to the light-off temperature for hydrocarbons and allowing the gases to pass through the catalyst;
   diverting a portion of the gases exiting the catalyst only when the engine speed is at steady state so that oxidation of hydrocarbons by the catalyst is at substantially a peak efficiency and using the portion of diverted gases to desorb and flush adsorbed hydrocarbons from the hydrocarbon trap back through the catalyst; and
   discontinuing the diversion of gases through the hydrocarbon trap after adsorbed hydrocarbons have been desorbed from the hydrocarbon trap.

2. The method defined in claim 1, which further comprises furnishing a control sensor which monitors the catalyst temperature and controls the prevention of gases passing through the hydrocarbon trap after the catalyst is heated to the light-off temperature for hydrocarbons.

3. The method defined in claim 1, which further comprises furnishing a control sensor which monitors the temperature of gases exhausted from the engine and controls the diversion of gases exiting the catalyst for desorbing the hydrocarbon trap.

4. The method defined in claim 1, which further comprises applying auxiliary heat to the catalyst when the catalyst is below the light-off temperature for hydrocarbons until the catalyst reaches the light-off temperature for hydrocarbons.

5. The method defined in claim 1, wherein the portion of gases exiting the catalyst and diverted through the hydrocarbon trap to desorb and flush hydrocarbons constitutes 5% to 20% of the total gases exiting the catalyst.

6. The method defined in claim 1, wherein the catalyst sequentially precedes the hydrocarbon trap such that gases passing through the hydrocarbon trap must first pass through the catalyst.

7. An apparatus for oxidizing hydrocarbons containing gases exhausted from an internal combustion engine, which comprises:
   an exhaust pipe system which accepts gases exhausted from the internal combustion engine before exhausting those gases into the atmosphere;

a catalyst connected to the exhaust pipe system;

a hydrocarbon trap connected to the exhaust pipe system; and a valve means by which all gases are directed via the exhaust pipe system through the hydrocarbon trap and out of the apparatus when the temperature of the catalyst is below the light-off temperature for hydrocarbons, by which gases are prevented from passing through the hydrocarbon trap and directed via the exhaust pipe system through the catalyst and out of the apparatus when the catalyst is heated to the light-off temperature for hydrocarbons and by which a portion of the gases exiting the catalyst are diverted through the hydrocarbon trap only when the engine speed is at a steady state such that the oxidation of hydrocarbons within the engine is at substantially a peak efficiency and using those diverted gases via the exhaust pipe system to desorb and flush adsorbed hydrocarbons from the hydrocarbon trap back through the catalyst, and by which the diversion of gases through the hydrocarbon trap is discontinued after adsorbed hydrocarbons have been desorbed from the hydrocarbon trap.

8. The apparatus defined in claim 7, which further comprises a control sensor which monitors the catalyst temperature and controls the valve means.

9. The apparatus defined in claim 7, which further comprises a control sensor which monitors the temperature of gases exhausted from the engine and controls the valve means.

10. The apparatus defined in claim 7, wherein the valve means comprises:

a first valve connected to the exhaust pipe system between the catalyst and the hydrocarbon trap and which may be set to direct all gases through the hydrocarbon trap, to prevent any gases from passing through the hydrocarbon trap, or to divert a portion of the gases exiting the catalyst through the hydrocarbon trap; and a second valve connected to the exhaust pipe system following the hydrocarbon trap and which may be set to allow gases exiting the hydrocarbon trap to be exhausted out of the apparatus or to direct that gas back through the catalyst.

11. The apparatus defined in claim 7, wherein the valve means comprises:

a first valve connected to the exhaust pipe system between the catalyst and the hydrocarbon trap and which may be set to direct all gases through the hydrocarbon trap, to prevent any gases from passing through the hydrocarbon trap, or to divert a portion of the gases exiting the catalyst through the hydrocarbon trap; and a second valve connected to the exhaust pipe system following the hydrocarbon trap and which may be set to allow gases exiting the hydrocarbon trap to be exhausted out of the apparatus or to direct that gas back to the exhaust pipe system at a point preceding the catalyst.

12. The apparatus defined in claim 7, wherein the valve means comprises a first valve connected to the exhaust pipe system between the catalyst and the hydrocarbon trap and which may be set to direct all gases through the hydrocarbon trap, to prevent any gases from passing through the hydrocarbon trap, or to divert a portion of the gases exiting the catalyst through the hydrocarbon trap; and a second valve connected to the exhaust pipe system following the hydrocarbon trap and which may be set to allow gases exiting the hydrocarbon trap to be exhausted out of the apparatus or to direct that gas back to the engine.

13. An apparatus for oxidizing the hydrocarbons containing gases exhausted from an internal combustion engine, which comprises:

an exhaust pipe system which accepts all gases exhausted from the internal combustion engine before exhausting those gases into the atmosphere;

a catalyst connected to the exhaust pipe system;

a first valve connected to the exhaust pipe system following the oxidation catalyst;

a hydrocarbon trap connected to the exhaust pipe system following the first valve;

a second valve connected to the exhaust pipe system following the hydrocarbon trap; and a control sensor which monitors the engine speed, the temperature of gases being exhausted from the engine, and the temperature of the catalyst and which controls the first valve and the second valve such that all gases exiting the catalyst are directed through the hydrocarbon trap via the first valve when the temperature of the catalyst is below the light-off temperature for hydrocarbons, such that gases are prevented from passing through the hydrocarbon trap via the first valve and are exhausted directly into the atmosphere after the catalyst is heated to the light-off temperature for hydrocarbons and such that a portion of the gases exiting the catalyst are diverted via the first valve through the hydrocarbon trap only when the engine speed is at steady state such that the oxidation of hydrocarbons within the engine is at peak efficiency and such that the gas diverted through the hydrocarbon trap is directed via the second valve back to a point in the exhaust pipe system preceding the catalyst and such that the diversion of gases through the hydrocarbon trap is discontinued via the first valve after adsorbed hydrocarbons have been desorbed from the hydrocarbon trap.

14. A method for oxidizing hydrocarbons contained in gases exhausted from an internal combustion engine, which comprises:

providing a catalyst;

passing the gases through a hydrocarbon trap and adsorbing hydrocarbons from the gases when the temperature of the catalyst is below a light-off temperature for hydrocarbons;

preventing the gases from passing through the hydrocarbon trap after the catalyst is heated to the light-off temperature for hydrocarbons and allowing the gases to pass through the catalyst;

diverting a portion of the gases exiting the catalyst when the engine speed is at steady state so that oxidation of hydrocarbons by the catalyst is at substantially a peak efficiency and using the portion of diverted gases to desorb and flush adsorbed hydrocarbons from the hydrocarbon trap back through the catalyst;

discontinuing the diversion of gases through the hydrocarbon trap after adsorbed hydrocarbons have been desorbed from the hydrocarbon trap; and furnishing a control sensor which monitors the engine speed and controls the diversion of gases exiting the catalyst for desorbing the hydrocarbon trap.

15. A method for oxidizing hydrocarbons contained in gases exhausted from an internal combustion engine, which comprises:

providing a catalyst;

passing the gases through a hydrocarbon trap and adsorbing hydrocarbons from the gases when the temperature of the catalyst is below a light-off temperature for hydrocarbons;

preventing the gases from passing through the hydrocarbon trap after the catalyst is heated to the light-off temperature for hydrocarbons and allowing the gases to pass through the catalyst;

diverting a portion of the gases exiting the catalyst when the engine speed is at steady state so that oxidation of hydrocarbons by the catalyst is at substantially a peak efficiency and using the portion of diverted gases to desorb and flush adsorbed hydrocarbons from the hydrocarbon trap back through the catalyst;

discontinuing the diversion of gases through the hydrocarbon trap after adsorbed hydrocarbons have been desorbed from the hydrocarbon trap; and furnishing a control sensor which monitors the catalyst temperature and controls the prevention of gases passing through the hydrocarbon trap after the catalyst is heated to the light-off temperature for hydrocarbons and which also monitors the engine speed and the temperature of gases exhausted from the engine and controls the diversion of gases exiting the catalyst for desorbing the hydrocarbon trap.

16. An apparatus for oxidizing hydrocarbons containing gases exhausted from an internal combustion engine, which comprises:

an exhaust pipe system which accepts gases exhausted from the internal combustion engine before exhausting those gases into the atmosphere;

a catalyst connected to the exhaust pipe system;

a hydrocarbon trap connected to the exhaust pipe system;

a valve means by which all gases are directed via the exhaust pipe system through the hydrocarbon trap and out of the apparatus when the temperature of the catalyst is below the light-off temperature for hydrocarbons, by which gases are prevented from passing through the hydrocarbon trap and directed via the exhaust pipe system through the catalyst and out of the apparatus when the catalyst is heated to the light-off temperature for hydrocarbons and by which a portion of the gases exiting the catalyst are diverted through the hydrocarbon trap when the engine speed is at a steady state such that the oxidation of hydrocarbons within the engine is at substantially a peak efficiency and using those diverted gases via the exhaust pipe system to desorb and flush adsorbed hydrocarbons from the hydrocarbon trap back through the catalyst, and by which the diversion of gases through the hydrocarbon trap is discontinued after adsorbed hydrocarbons have been desorbed from the hydrocarbon trap; and a control sensor which monitors the engine speed and controls the valve means.

17. An apparatus for oxidizing hydrocarbons containing gases exhausted from an internal combustion engine, which comprises:

an exhaust pipe system which accepts gases exhausted from the internal combustion engine before exhausting those gases into the atmosphere;

a catalyst connected to the exhaust pipe system;

a hydrocarbon trap connected to the exhaust pipe system;

a valve means by which all gases are directed via the exhaust pipe system through the hydrocarbon trap and out of the apparatus when the temperature of the catalyst is below the light-off temperature for hydrocarbons, by which gases are prevented from passing through the hydrocarbon trap and directed via the exhaust pipe system through the catalyst and out of the apparatus when the catalyst is heated to the light-off temperature for hydrocarbons and by which a portion of the gases exiting the catalyst are diverted through the hydrocarbon trap when the engine speed is at a steady state such that the oxidation of hydrocarbons within the engine is at substantially a peak efficiency and using those diverted gases via the exhaust pipe system to desorb and flush adsorbed hydrocarbons from the hydrocarbon trap back through the catalyst, and by which the diversion of gases through the hydrocarbon trap is discontinued after adsorbed hydrocarbons have been desorbed from the hydrocarbon trap; and a control sensor which monitors the engine speed, the temperature of gases being exhausted from the engine, and the catalyst temperature and controls the valve means.

18. An apparatus for oxidizing hydrocarbons containing gases exhausted from an internal combustion engine, which comprises:

an exhaust pipe system which accepts gases exhausted from the internal combustion engine before exhausting those gases into the atmosphere;

a catalyst connected to the exhaust pipe system;

a hydrocarbon trap connected to the exhaust pipe system; and a valve means by which all gases are directed via the exhaust pipe system through the hydrocarbon trap and out of the apparatus when the temperature of the catalyst is below the light-off temperature for hydrocarbons, by which gases are prevented from passing through the hydrocarbon trap and directed via the exhaust pipe system through the catalyst and out of the apparatus when the catalyst is heated to the light-off temperature for hydrocarbons and by which a portion of the gases exiting the catalyst are diverted through the hydrocarbon trap when the engine speed is at a steady state such that the oxidation of hydrocarbons within the engine is at substantially a peak efficiency and using those diverted gases via the exhaust pipe system to desorb and flush adsorbed hydrocarbons from the hydrocarbon trap back through the catalyst, and by which the diversion of gases through the hydrocarbon trap is discontinued after adsorbed hydrocarbons have been desorbed from the hydrocarbon trap, the valve means comprising a first valve connected to the exhaust pipe system between the catalyst and the hydrocarbon trap and which may be set to direct all gases through the hydrocarbon trap, to prevent any gases from passing through the hydrocarbon trap, or to divert a portion of the gases exiting the catalyst through the hydrocarbon trap and a second valve connected to the exhaust pipe system following the hydrocarbon trap and which may be set to allow gases exiting the hydrocarbon trap to be exhausted out of the apparatus or to direct that gas back through the catalyst; and a control sensor which monitors the catalyst temperature and controls the first valve accordingly and which also monitors the engine speed and the temperature of the gases being exhausted from the engine and controls the first valve and the second valve accordingly.

19. An apparatus for oxidizing hydrocarbons containing gases exhausted from an internal combustion engine, which comprises:

an exhaust pipe system which accepts gases exhausted from the internal combustion engine before exhausting those gases into the atmosphere;

a catalyst connected to the exhaust pipe system;

a hydrocarbon trap connected to the exhaust pipe system;

a valve means by which all gases are directed via the exhaust pipe system through the hydrocarbon trap and out of the apparatus when the temperature of the catalyst is below the light-off temperature for hydrocarbons, by which gases are prevented from passing through the hydrocarbon trap and directed via the exhaust pipe system through the catalyst and out of the apparatus when the catalyst is heated to the light-off temperature for hydrocarbons and by which a portion of the gases exiting the catalyst are diverted through the hydrocarbon trap when the engine speed is at a steady state such that the oxidation of hydrocarbons within the engine is at substantially a peak efficiency and using those diverted gases via the exhaust pipe system to desorb and flush adsorbed hydrocarbons from the hydrocarbon trap back through the catalyst, and by which the diversion of gases through the hydrocarbon trap is discontinued after adsorbed hydrocarbons have been desorbed from the hydrocarbon trap the valve means comprising a first valve connected to the exhaust pipe system between the catalyst and the hydrocarbon trap and which may be set to direct all gases through the hydrocarbon trap, to prevent any gases from passing through the hydrocarbon trap, or to divert a portion of the gases exiting the catalyst through the hydrocarbon trap and a second valve connected to the exhaust pipe system following the hydrocarbon trap and which may be set to allow gases exiting the hydrocarbon trap to be exhausted out of the apparatus or to direct that gas back to the exhaust pipe system at a point preceding the catalyst; and a control sensor which monitors the catalyst temperature and controls the first valve accordingly and which also monitors the engine speed and the temperature of the gases being exhausted from the engine and controls the first valve and the second valve accordingly.

20. An apparatus for oxidizing hydrocarbons containing gases exhausted from an internal combustion engine, which comprises:

an exhaust pipe system which accepts gases exhausted from the internal combustion engine before exhausting those gases into the atmosphere;

a catalyst connected to the exhaust pipe system;

a hydrocarbon trap connected to the exhaust pipe system;

a valve means by which all gases are directed via the exhaust pipe system through the hydrocarbon trap and out of the apparatus when the temperature of the catalyst is below the light-off temperature for hydrocarbons, by which gases are prevented from passing through the hydrocarbon trap and directed via the exhaust pipe system through the catalyst and out of the apparatus when the catalyst is heated to the light-off temperature for hydrocarbons and by which a portion of the gases exiting the catalyst are diverted through the hydrocarbon trap when the engine speed is at a steady state such that the oxidation of hydrocarbons within the engine is at substantially a peak efficiency and using those diverted gases via the exhaust pipe system to desorb and flush adsorbed hydrocarbons from the hydrocarbon trap back through the catalyst, and by which the diversion of gases through the hydrocarbon trap is discontinued after adsorbed hydrocarbons have been desorbed from the hydrocarbon trap, the valve means comprising a first valve connected to the exhaust pipe system between the catalyst and the hydrocarbon trap and which may be set to direct all gases through the hydrocarbon trap, to prevent any gases from passing through the hydrocarbon trap, or to divert a portion of the gases exiting the catalyst through the hydrocarbon trap and a second valve connected to the exhaust pipe system following the hydrocarbon trap and which may be set to allow gases exiting the hydrocarbon trap to be exhausted out of the apparatus or to direct that gas back to the engine; and a control sensor which monitors the catalyst temperature and controls the first valve accordingly and which also monitors the engine speed and the temperature of the gases being exhausted from the engine and controls the first valve and the second valve accordingly.

* * * * *